Figures 1, 2:
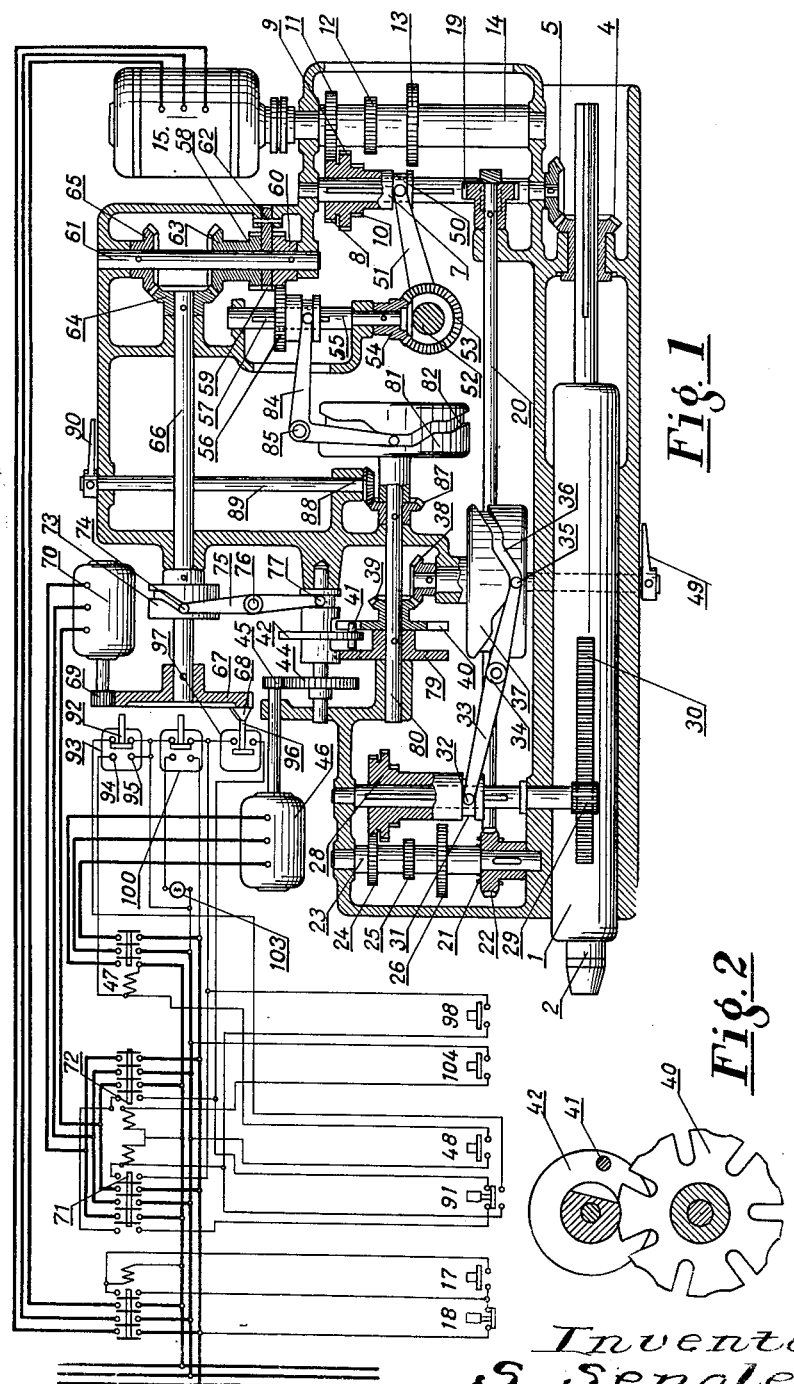

March 13, 1951  S. SENGLET  2,545,008
MACHINE TOOL SPINDLE DRIVE AND FEED CONTROL DEVICE
Filed Dec. 12, 1945

Inventor
S. Senglet
By Mason K Downing Seebold
Attys

Patented Mar. 13, 1951

2,545,008

UNITED STATES PATENT OFFICE 2,545,008

MACHINE TOOL SPINDLE DRIVE AND FEED CONTROL DEVICE

Serge Senglet, Geneva, Switzerland, assignor to Societe Genevoise d'Instruments de Physique, Geneva, Switzerland, a firm of Switzerland Application December 12, 1945, Serial No. 634,589
In Switzerland December 22, 1944

3 Claims. (Cl. 74—325)

The object of the present invention is a machine tool spindle drive and feed control device.

This device comprises a first gear-box coupled operatively with the axial displacement sleeve in which the machine tool spindle is revolvable, a second gear-box coupled operatively with the rotary drive means of said spindle, coupling gear between driven shaft of second gear-box and driving shaft of first gear-box, first and second gear-box sliding gears shifting cams with common intermittent drive and change-over clutch, rotary indexes operatively connected with said cams, contacting means controlling driving motors of said common cam drive and change-over clutch, and interlocking means of said contacting means.

This device comprises also a relay gear-box between said second gear box and its operating cam, the latter actuating a single sliding gear whose shaft is operatively connected with a shifting lever of the second gear-box sliding gears, said single sliding gear being apt to be brought in mesh by its cam alternatively with three adjacent gears, the central one of which is stationary while the outer ones are driven in opposite directions by said change-over clutch driving motor.

The annexed drawing represents by way of example and schematically an embodiment of the invention as applied to a drilling machine. Fig. 1 is a general view partially in section, and Fig. 2 shows a detail.

The working spindle 2 of the drilling machine rotates in a sleeve 1 which can be moved axially. The motor 15 drives two gear boxes, the first of which controlling the feed of the spindle and the second one its rotation speed. The second one comprises a shaft coupled to that of the motor 15 and on which are fixed three gear wheels 11, 12 and 13, cooperating with the three gearings 8, 9 and 10 of the sliding gear 7. The shaft, on which the latter slides, controls the rotation of the spindle through bevel gears 5 and 4. The shaft of the sliding gear 7 further comprises a helical gear 19 acting through the shaft 20 on a helical gear 21, 22, which rotates the shaft 23 of the first gear box. This shaft carries the three gear wheels 24, 25 and 26 cooperating with the three gearings of the sliding gear 28, the shaft of which produces the feed of the spindle by means of the gear wheel 29 and the rack 30, carried by the sleeve 1.

The control board, supposed to be situated at a certain distance from the spindle of the drilling machine, comprises six control members, i. e. cut-out switches 17 and 18, 48 and 91, 98 and 104, which control the three motors 15, 46 and 70. The motor 46 can alternately actuate the first cam 37 which directly controls the sliding gear 28 and the second cam 81 which controls the sliding gear 7 through a sliding pinion 56; the latter cooperates with the three wheels 58, 59 and 60; the wheel 59 is fixed and the two wheels 58 and 60 can rotate in opposite directions to each other under the action of an operating member formed by the rotary shaft 66. This shaft, which is driven by the motor 70, also comprises a cam 73, controlling the axial displacements of a pin-wheel 41—42 cooperating alternately with two Maltesian-crosses 40 and 79 in order to alternately couple the motor 46 with the two cams 37 and 81.

The operation of the mechanism is as follows:
In order to start or to stop the motor 15, the operator uses the switches 17 and 18. If he desires to alter the rotary speed of the spindle, he acts on the switch 91, which, acting itself on the contactor 71, starts the motor 70.

To simplify matters, the electric circuits, which do not show anything new, shall not be described in detail. The motor 70, when rotating, drives by means of the pinions 69 and 67 the operating member, i. e. the shaft 66, which leaves its initial position. Its rotation continues up to the moment when the projection 68 pushes the plunger 92 of the cut-out switch 93, which will stop the motor 70 and re-establish the circuit between the contacts 94 and 95, excite the contactor 47 and start the motor 46, which drives by means of the pinions 44 and 45 the plate 42 of the Maltesian-cross change-over clutch (see also Fig. 2).

The cam 73, by rotating with the shaft 66, acts on the finger 74 of a lever 75 pivoting about 76 and which will move the plate 42 towards the left by means of the finger 77. This plate will drive through its pin 41 the follower 79 of the Maltesian-cross and will cause a stepwise rotation of the shaft 80. The second cam 81, dependent on the shaft 80, embodies a groove 82, the contours of which correspond to the successive positions to be taken by the sliding pinion 56 in order that in its successive movements, the range of speeds of the second gear box is progressively formed.

The cam 81 acts on the sliding pinion 56 by means of a crank lever 84 pivoting about 85; the sliding pinion 56 may engage either with the wheel 58 which derives its rotary motions from the shaft 66 through the bevel pinions 63 and 64, or with the fixed wheel 59 fastened by means of the pin 62, or finally with the wheel 60, which derives its rotary motion from the shaft 66, in a sense opposite to 58, by means of the shaft 61 and the bevel pinions 64 and 65.

The sliding pinion 56 moves axially the sliding gear 7 of the second gear box by means of the shaft 55 fitted with a key 57, the bevel pinions 53 and 54, the shaft 52 and the arm 51 shifting in 50 the sliding gear 7. The latter travels over a distance necessary for passing from the meshing of 8 and 11 to the meshing of 9 and 12. The sliding gear 7 has to travel over equal distances to pass from the meshing 9—12 to the meshing 8—11 or 10—13.

Let us suppose that, at the time of operation, all the parts are in a position as shown on Fig. 1. The rotation of the operating member 66 causes the pinion 60 to revolve through such an angle that the sliding gear 7, when reaching its central position, will cause 9 and 12 to mesh; in the same time, the rotation of 66 leading the cam 73 will bring the plate 42 in opposition to 79 and, at the end of the rotation of 66, 68 acting on 92, will cause the motor 46 to start, which in its turn will cause a stepwise rotation of the cam 81 owing to the Maltesian-cross clutch. The cam is connected to an index 90, visible from the control board, by means of pinions 87 and 88, as well as by means of the shaft 89. This index will begin to rotate, also stepwise, on a circular scale, not shown, bearing indications as to the various rotary speeds of the spindle 2. The index stops for a moment on each of the indications, in order to give the operator time to stop it definitely at the required speed, by releasing in due time the cut-out switch 91. Exactly at this moment, the motor 46, as well as the index 90 and the cam 81 stop, the contactor 72 is excited and the motor 70 begins to rotate in a sense opposite to its previous rotation and will keep running until the projection 67 pushes the plunger 96 of the cut-out switch 97, which causes the motor 70 to stop, the shaft 66 having again taken its initial position.

According to the position of the cam 81, when it stops, three possibilities may arise:

In the first case, when the sliding pinion 56 has come back to the position in which it was at the beginning of the operator's action; it therefore engages again with 60. The reversed rotation of the motor 70 cancels the travel caused by its previous rotation and the sliding gear 7 returns to the position previously occupied, as shown on the drawing; 8 and 11 are again in mesh.

In the second case, 56 has come to engage with the fixed pinion 59, the reversed rotation of 70 has no effect on 56 and the sliding gear 7 stays in its central position, 9 and 12 remaining in mesh.

In the third case, the cam 81 has brought 56 in mesh with 58 which still rotates in a sense opposite to 60. The reversed rotation of the motor acting on a pinion, the action of which is in itself inverted, will effect a travel of 7 in the same direction as that brought about by the first rotation of the motor; the sliding gear 7 will move away still further from the position indicated in the drawing and 10 will engage with 13.

It is clear that it is possible, by using this process, to actuate several sliding gears 7; in this case, it will be sufficient to provide several groups of pieces 56, 55, 54, 53 and 51, arranged for example in a circle around the wheels 58, 59 and 60, and each controlled by its cam.

It is also possible by making the necessary electric connections (which have not been shown in the drawing to prevent overburdening), to make provision that the action of the cut-out 91, in addition to the one described, begins to stop the motor 15 in such a manner that it automatically starts again as soon as the action on 91 ceases.

Thus, the second operating member, the shaft 66, always starts from a basic position for effecting the speed changes of the spindle and automatically returns to that position as soon as the operator has ceased to press on the cut-out 91. In this basic position, the plate 42 can only operate the Maltesian-cross 40.

If it is required to effect a change of the spindle feed, the operator presses on another control member, the cut-out 48 of the control board, which will start the motor 46 causing the rotation of the plate 42 and the stepwise rotation of the Maltesian-cross 40. The latter mounted idle on the shaft 80, drives the first cam 37 and the feed index 49 by means of the bevel pinions 38 and 39. The cam 37 shows a sinuous groove 36 in which the end 35 of a lever 33 pivoting about 34 is engaged, the opposite end of said lever shifting in 31 and 32 the sliding gear 28 of the first gear box.

The index 49, rotating stepwise on a dial not shown on which the various feeds available are indicated, stops for a while on each of them, to enable the operator to release the cut-out 48 in time in order to remain on the feed attained by the index.

It may also be useful in certain cases to bring about by the action of the telecontrol a disconnection between the spindle 2 and the motor 15. This operation will find its application, for example, when it is required to turn the spindle by hand in order to stop it in a position suitable for exchanging the tools which it carries or for any other purpose. This additional action can be obtained by providing a cut-out 100, on which the projection 68 of the wheel 67 will act before reaching the cut-out 93. Thus, the shaft 66 will be able to travel only over half of its normal range, and will therefore bring the sliding gear 7 halfway between the pinions of the shaft 14. No meshing whatsoever will therefore be possible in the second gear box and the spindle 2 will be disconnected from the motor 15.

In order to realise this additional combination, it will be necessary to provide on the control board two additional cut-outs 98 and 104, the first one serving to bring about the disconnection and the second one for the re-engagement of the spindle. The cut-outs 100, 98 and 104, with their electrical connection for the engagement or the disengagement of the spindle, are shown on the drawing. When the spindle is disconnected, a pilot lamp 103 warns the operator.

The embodiment represented uses two different ways to operate the gear changes according to the gear box utilised. For the first gear box which is responsible for the rate of feed of the spindle, the transmitted power is small and, therefore, the gear wheels are small and the corresponding travel of the sliding gear 28 is short. An ordinary cam 37 may be sufficient to operate the travel of the sliding gear.

Conditions are different in the case of the gear box controlling the rotation of the spindle, and which has to transmit the full power of the motor 15; its gear wheels are sturdy and the travel of the sliding gear 7 is longer. For this reason, it is advisable to use an operating member, the shaft 66, playing the part of a relay for operating its motion. The invention is not limited to the case schematically shown on the drawing; particularly, it is not necessary for the energy source for operating the settings to be of electric nature, it is possible to use pneumatic or hydraulic means for the same purpose.

What I claim is:

1. In a machine tool spindle drive and feed control device, a sleeve in which the machine tool spindle is revolvable, axial displacement means for said sleeve, a first gear box coupled operatively with said axial displacement means, said first gear box comprising a sliding gear and a driving shaft, rotary drive means for said spindle, a second gear-box coupled operatively with said rotary drive means, said second gear box comprising a sliding gear and a driven shaft, coupling gear between said driven shaft of second gear-box and said driving shaft of first gear-box, first and second cams intended to shift respectively first and second gear-box sliding gears, two Maltesian crosses each operatively connected with one of said cams, an axially movable pin-wheel cooperating alternatively with said Maltesian crosses, a first motor driving said pin-wheel, a second motor controlling the axial displacements of said pin-wheel, rotary indexes operatively connected with said cams, and contacting means controlling said motors.

2. In a machine tool spindle drive and feed control device, a sleeve in which the machine tool spindle is revolvable, axial displacement means for said sleeve, a first gear box coupled operatively with said axial displacement means, said first gear box comprising a sliding gear and a driving shaft, rotary drive means for said spindle, a second gear-box coupled operatively with said rotary drive means, said second gear-box comprising a sliding gear and a driven shaft, coupling gear between said driven shaft of second gear-box and said driving shaft of first gear-box, first and second cams intended to shift respectively first and second gear-box sliding gears, two Maltesian-crosses each operatively connected with one of said cams, an axially movable pin-wheel cooperating alternatively with said Maltesian crosses, a first motor driving said pin-wheel, a second motor controlling the axial displacements of said pin-wheel, rotary indexes operatively connected with said cams, contacting means controlling said motors, a relay gear-box between said second gear-box and its operating cam, a single sliding gear actuated by said second cam, a shifting lever of the second gear-box sliding gear operatively connected with said single sliding gear, three adjacent gears with which said single sliding gear is apt to be brought alternatively in mesh by said second cam, the central gear of said three adjacent gears being stationary while the outer ones are driven in opposite directions by said second motor.

3. In a machine tool spindle drive and feed control device, a sleeve in which the machine tool spindle is revolvable, axial displacement means for said sleeve, a first gear box coupled operatively with said axial displacement means, said first gear box comprising a sliding gear and a driving shaft, rotary drive means for said spindle, a second gear-box coupled operatively with said rotary drive means, said second gear box comprising a sliding gear and a driven shaft, coupling gear between said driven shaft of second gear-box and said driving shaft of first gear-box, first and second cams intended to shift respectively first and second gear-box sliding gears, two Maltesian crosses each operatively connected with one of said cams, an axially movable pin-wheel cooperating alternatively with said Maltesian crosses, a first motor driving said pin-wheel, a second motor controlling the axial displacements of said pin-wheel, rotary indexes operatively connected with said cams, contacting means controlling said motors, an additional contacting means interlocked with the above-mentioned ones, whereby the second gear-box sliding gears are stopped in idling position.

SERGE SENGLET.

REFERENCES CITED

The following references are of record in the file of this patent:

UNITED STATES PATENTS

| Number | Name | Date |
| --- | --- | --- |
| 1,492,069 | Hunt et al. | Apr. 29, 1924 |
| 1,527,247 | Bouillon | Feb. 24, 1925 |
| 1,588,004 | Blood | June 8, 1926 |